J. MURPHY.
Process of Introducing Antiseptics into Rubber Hose.
No. 159,345. Patented Feb. 2, 1875.
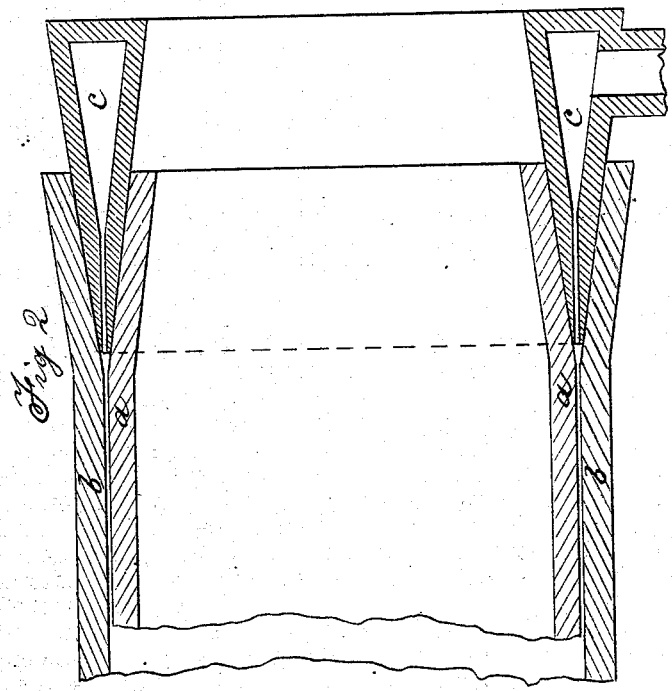
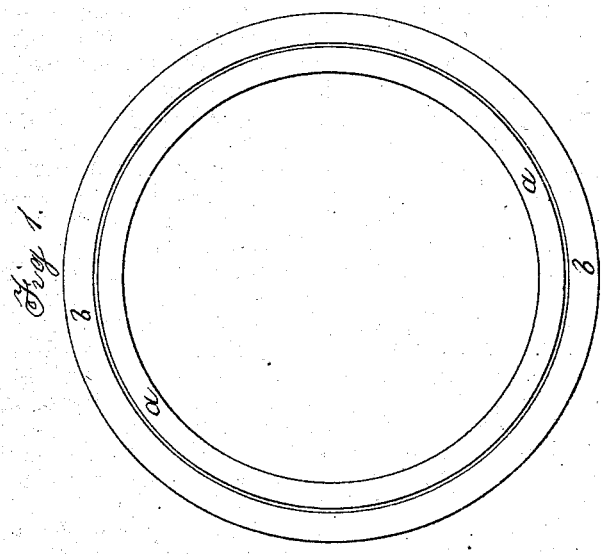

UNITED STATES PATENT OFFICE.

JOHN MURPHY, OF NEW YORK, N. Y.

IMPROVEMENT IN PROCESSES OF INTRODUCING ANTISEPTICS INTO RUBBER HOSE.

Specification forming part of Letters Patent No. 159,345, dated February 2, 1875; application filed November 4, 1874.

*To all whom it may concern:*

Be it known that I, JOHN MURPHY, of the city, county, and State of New York, have invented certain new and useful Improvements in Rubber Hose; and I do hereby declare that the following is a full, clear, and exact description thereof, which will enable others skilled in the art to which it pertains to make and use the same, reference being had to the accompanying drawings and to the letters of reference marked thereon, which form a part of this specification.

The object of my invention is to facilitate the process of introducing antiseptic liquids into the fibers of the cloth of which the body of the hose is composed, after the hose has been made and vulcanized.

Heretofore, to render hose indestructible to decay, several modes have been adopted. Either the cloth, before being made into hose, was saturated with the antiseptic liquid or mixed with the rubber compound with which the cloth or fabric is coated; or the hose is made and vulcanized and the antiseptic liquid forced through the rubber coating into the fibers of the cloth of which the body of the hose is composed.

In the first case, the heat to which the hose is necessarily subjected, for the purpose of curing or vulcanizing, would either evaporate or render ineffective the antiseptic material contained in the cloth or compound, or, by decomposing it, would tend even to destroy the strength of the fabric; and in the other case, when the antiseptic liquid is forced into the hose after the same is made and vulcanized, the process is slow and expensive.

In the accompanying drawings, Figure 1 represents a cross-section of a hose as it is to be made to be adapted to my process of introducing the antiseptic liquid. Fig. 2 is a longitudinal section of the end portion of a hose having an annular metallic mouth-piece inserted, through which the liquid is forced in between the two parts of the hose.

I make the hose of two parts, an interior one, $a$, and an exterior one, $b$. Both are to be made on the same mandrel, and the exterior one, $b$, on top of the interior one, $a$; but the two parts are not cemented together, but on the contrary, are prevented from adhering together by the application of soap-stone powder or other suitable material.

After the hose is thus made up and cured, as is well known to the trade, the antiseptic liquid is introduced between the two parts $a$ and $b$, and this may be done by inserting an annular mouth-piece, $c$, between the two parts $a$ and $b$ at one end of the hose, and through it the liquid can be forced into and along the whole length of the hose. The india-rubber coating of the cloth being very thin, the fabric will readily absorb the antiseptic liquid.

The shape and construction of the mouth-piece $c$ is easily understood from Fig. 2, where it is shown in section; but there are other applications which may be used with success for the introduction of the antiseptic liquid.

Instead of two separate tubes, one within the other, three or more may be put together.

What I claim, therefore, and desire to secure by Letters Patent, is—

The method of impregnating hose with antiseptic substances consisting in the forcible introduction of antiseptic material in solution between the separate tubes which compose the hose.

In testimony that I claim the foregoing as my own invention I affix my signature in the presence of two witnesses.

JOHN MURPHY.

Witnesses:
W. LEWIS,
M. HOWE, Jr.